United States Patent [19]

Bisseling

[11] Patent Number: 4,733,144
[45] Date of Patent: Mar. 22, 1988

[54] ELECTRONIC DIGITIZED PROPORTIONAL-INTEGRAL CONTROLLER

[75] Inventor: Wilhelmus T. L. Bisseling, Meerlo, Netherlands

[73] Assignee: Oce-Nederland B.V., Venlo, Netherlands

[21] Appl. No.: 30,589

[22] Filed: Mar. 27, 1987

[30] Foreign Application Priority Data

Apr. 1, 1986 [EP] European Pat. Off. ........ 86104381.8

[51] Int. Cl.⁴ .............................................. G05B 19/28
[52] U.S. Cl. .................................... 318/318; 318/341; 318/609
[58] Field of Search ............... 318/609, 610, 341, 318, 318/328, 314; 324/78 R, 78 J; 328/133, 134

[56] References Cited

U.S. PATENT DOCUMENTS

| | | | |
|---|---|---|---|
| 3,772,580 | 11/1973 | Odone | 318/318 |
| 3,832,609 | 8/1974 | Barrett et al. | 318/52 |
| 4,112,479 | 9/1978 | White | 361/243 |
| 4,236,202 | 11/1980 | Giles et al. | 318/609 X |
| 4,240,014 | 12/1980 | Muller | 318/328 |
| 4,475,073 | 10/1984 | Hawkins | 318/609 |
| 4,540,926 | 9/1985 | Kolzer et al. | 318/609 |
| 4,564,795 | 1/1986 | Parkes et al. | 318/318 X |
| 4,623,827 | 11/1986 | Ito | 318/609 |
| 4,680,516 | 7/1987 | Guzik et al. | 318/318 X |

Primary Examiner—Benjamin Dobeck
Attorney, Agent, or Firm—Reed Smith Shaw & McClay

[57] ABSTRACT

A digital proportional-integral controller for controlling the speed of a d.c. electric motor in a copying machine and synchronizing it with the speed of another motor in the copying machine. The proportional stage and the integral stage of the controller are each formed by an up/down counter which counts up or down depending upon the pulses of the actual speed signal and the reference signal. Logic circuits are provided for processing the speed signal pulses and the reference signal pulses before they are fed to the up/down counters. The controller also has an interface for a two-wire bus system over which data and commands for adjusting and varying the control parameters can be input.

16 Claims, 9 Drawing Figures

ELECTRONIC DIGITIZED PROPORTIONAL-INTEGRAL CONTROLLER

FIELD OF THE INVENTION

The present invention relates to an electronic proportional-integral controller for controlling the speed of an electric motor, more particularly a d.c. motor, in accordance with the frequency of a reference signal. Controllers of this kind are used for controlling the various drive units in a copying machine.

BACKGROUND OF THE INVENTION

It is important that the movements of various units in a copying machine such as the optical scanning system, the image recording medium, the paper transport system and the like, should be accurately synchronized with one another to produce high quality copies. Generally, this synchronization is achieved by driving all the units or components of the copying machine by a common drive unit having a single transmission. Since, however, this necessitates an expensive transmission design, it is desirable to separate the drives for the various units so that the copying machine construction is simplified, the ease of servicing is increased and the inert masses required to be moved during the operation of the copying machine are reduced. The separate drivves for the various units, however, have to be synchronized electronically. One way this can be achieved is by sensing the speed of one of the drive units, such as the motor for the image recording medium, and using it to generate a reference signal, which is used to control the speeds of the drives of the other units.

Separate drives for the various units necessitate controllers which can easily be adjusted at any time to the conditions of the control system such as the power of the drive motor, the inertia of driven parts and the like. The controllers also need to allow substantially immediate adjustment of the speed of the controlled motor or drive to the reference frequency within close tolerances.

Typically these controllers have a speed sensor for generating a speed signal the frequency of which represents the motor output speed, a proportional circuit which generates a proportional control (P-control) signal corresponding to the difference between the frequencies of the reference signal and of the speed signal, an integrator which generates an integral control (I-control) signal corresponding to the time integral of the difference between the frequencies of the reference signal and of the speed s.,,nal, an adder, which generates an output signal corresponding to the sum or the weighted sum of the two control signals (P-control and I-control), and an output stage for controlling the motor in accordance with the adder output signal. Controllers of this kind can be made using either analog or digital components.

Although analog controllers allow rapid signal processing and hence a low delay time for the control system, they have the disadvantages that the accuracy of the control is limited and the adjustment to the conditions of use at any time is a relatively laborious operation requiring the balancing of resistors and the like.

In contrast, digital control systems have high accuracy and little liability to trouble while being relatively cheap. In digital control systems, the input variables such as the frequency of the reference signal and the scanned actual speed signal are usually quantified and then arithmetic operations are carried out to form the set-value/actual-value difference used to generate the proportional component and the integral component, and to form the final control signal. Since these operations require some computer time, the control time is relatively long. It would be desirable, therefore, to have a digital control system which had a short control time.

SUMMARY OF THE INVENTION

Generally, the present invention provides a versatile digital proportional-integral controller having a short control time and a high long-term stability, and which can be adjusted to different conditions of use within a wide range. As a result of these properties, the controller according to the present invention makes it possible to provide a copying machine with separate drives for the various subsystems while guaranteeing accurate synchronization of the subsystems.

According to the present invention, a proportional-integral controller uses a speed signal from the controlled motor and a reference signal from a reference signal generator, preferably a reference drive, to generate a motor control signal. The controller has a proportional circuit and an integrator circuit which are each formed by a logic circuit and an up/down counter. The counters receive the up and down counting pulses from the preceding logic circuit which directly utilizes the speed signal and the reference signal.

The proportional circuit is based on the operating principle that the speed signal and the reference signal are converted to standardized signals, wherein the pulse width of each corresponds to the cycle time of the original speed signal or reference signal, respectively. If, during the speed signal cycle, the reference signal cycle has not yet started or has already ended, the counter counts up at a predetermined clock frequency. If, conversely, during the reference signal cycle, the speed signal cycle has not yet started or has already ended, the counter counts down at the same frequency. On completion of the last of the two cycles, the contents of the counter is used for further signal processing and the counter is reset so that a new counting cycle can start. In this way, an output signal proportional to the difference between the cycle times is generated at very short intervals on the order of magnitude of the speed signal and reference signal cycles.

The counter of the integrator circuit counts up on each rising flank of the speed signal and counts down on the rising flank of the reference signal. As a result, the content of the integrator counter at any time indicates the integral value of the difference between the frequency of the speed signal and the frequency of the reference signal.

If required, the logic circuits of the proportional circuit and the integrator circuit may contain suitable buffer means to prevent the counter capacity from being exceeded or undershot, (i.e. contents of the counter less than zero) and to prevent the simultaneous feed of an up and down counting pulse to the counter.

With its simple circuit construction and short control time, the present invention uses steps which guarantee reliable and trouble-free signal processing and increases the adjustability of the controller to different requirements and operating conditions. Preferably, different sets of coordinated adjustment parameters for the control system can be stored and selected at any time according to different requirements by means of suitable control commands.

Other advantages of the present invention will become apparent from the following detailed description and accompanying drawings of a presently preferred embodiment of the best mode of carrying out the invention.

DESCRIPTION OF THE PREFERRED EMBODIMENT

In a preferred embodiment of the present invention a command unit compatible with a two-wire bus system is provided for the storage of the adjustment parameters and for transmitting the control commands. A bus system of this kind is described in U.S. Pat. No. 3,889,236 and in European Pat. No. 0,051,332 and is known as an I²C bus. In addition, to commands for the basic adjustment, start of operation, controller operation interruption and the like, commands for switching the controller to test operation can also be input via the bus system and via the command unit connected as a receiver to the bus system, so that the controller can be tested for correct operation.

The entire controller is preferably constructed as an integrated component. This reduces manufacturing costs and gives a compact construction and facilitates controller installation.

Figure 1:
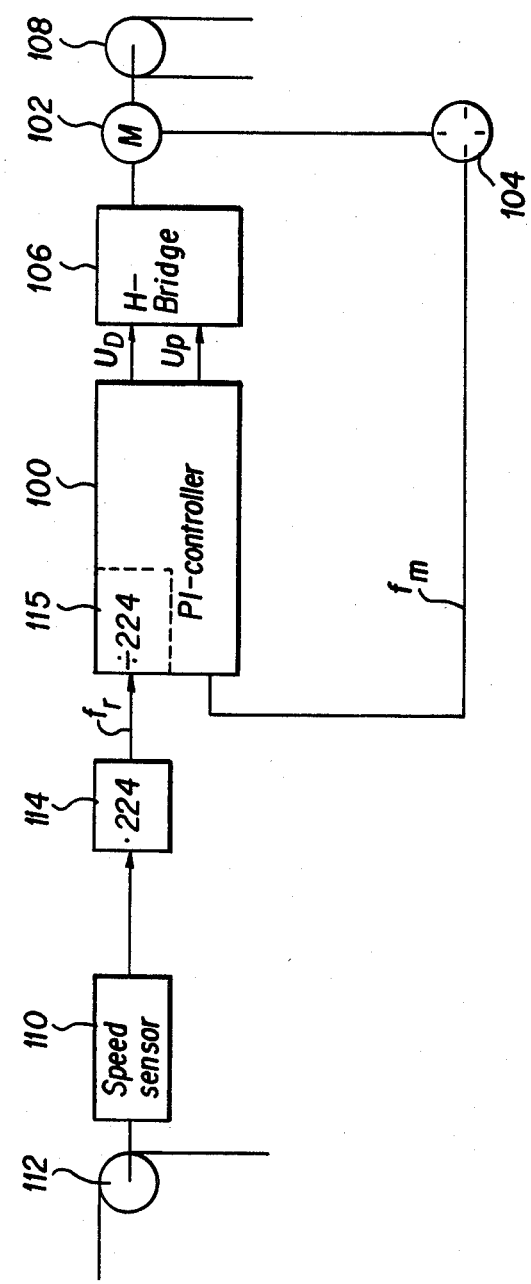
FIG. 1 is a diagram of a control system using a proportional-integral controller according to the present invention.

FIG. 1 diagrammatically illustrates a control system containing a proportional-integral controller (PI-controller) 100 according to the present invention wherein a d.c. motor 102 is used, for example, to drive a subsystem such as a shaft 108 in a copying machine. A speed sensor 104 senses the speed of motor 102 and generates a speed signal $f_m$ in the form of a pulse signal whose frequency is proportional to the motor speed. The speed signal $f_m$ is used by the PI-controller to generate the signal for controlling motor 102. The output frequency of speed sensor 104 should as far as possible be greater than 500 Hz. Another speed sensor 110 senses the speed of a shaft 112 of another subsystem of the copying machine. The subsystem containing shaft 112 constitutes a guide or reference system such that the speed of motor 102 is to be synchronized with the speed of shaft 112.

The output frequency of speed sensor 110, which is also about 500 Hz, is increased by a given factor, such as the factor 224, in a frequency multiplier 114. Frequency multiplier 114 is preferably formed by two phase locked loops (PLL) which successively multiply the frequency by the factors 14 and 16. The output signal of frequency multiplier 114 forms a reference signal $f_r$ which is used by the PI-controller to generate the signal for controlling motor 102.

PI-controller 100 receives speed signal $f_m$ and reference signal $f_r$ and delivers a binary signal $U_D$, which represents the desired direction of movement of motor 102, and a pulse signal $U_p$ of variable pulse width, to a bridge circuit 106 (H-bridge) which controls motor 102. The speed of motor 102 is adjusted to a value proportional to reference signal $f_r$ by means of PI-controller 100 by variation of the useful width of pulse signal $U_p$. In this way the movement of shaft 108, driven by motor 102, is synchronized with the movement of shaft 112.

The frequency of reference signal $f_r$ is reduced by a suitable factor, such as 224, by a frequency divider 115 integrated in PI-controller 100. This allows for finely graduated adjustment of the transmission ratio between the speeds of shafts 112 and 108. The rotation of motor 102 can be synchronized with the rotation of shaft 112 with an accuracy of 0.2%.

Figure 2:
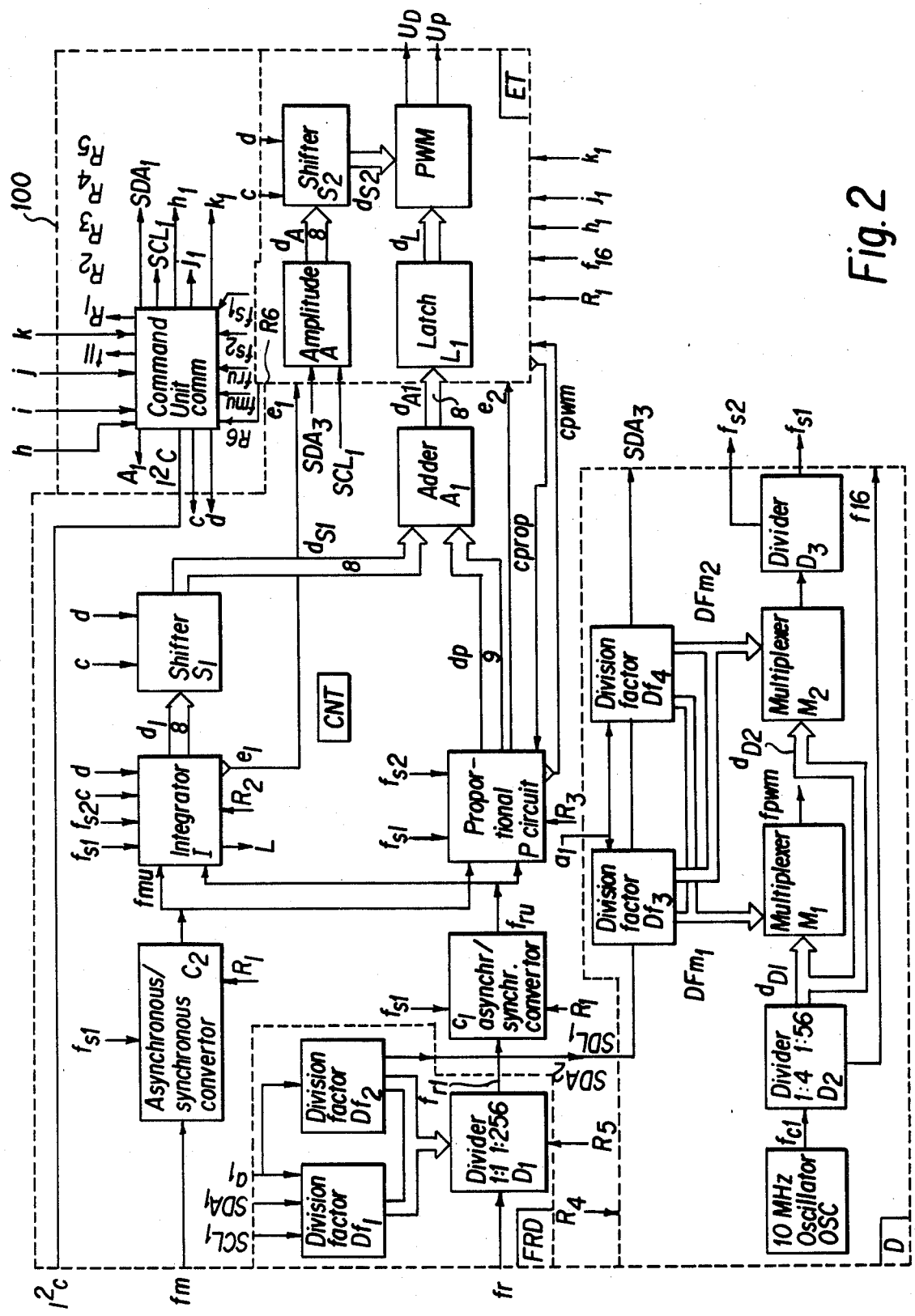
FIG. 2 is a block schematic of the controller shown in FIG. 1.

PI-controller 100 is formed by an integrated circuit (3 μm C-MOS) constructed in the standard cell technique. Referring to FIG. 2, PI-controller 100 comprises: a frequency divider unit FRD by means of which the frequency of reference signal $f_r$ is reduced in accordance with a preset frequency ratio; a controller unit CNT for processing speed signal $f_m$ and frequency-supported reference signal $f_{rl}$; an output stage ET, which delivers the output signals $U_D$ and $U_p$ to bridge circuit 106; a clock generator D; and a command unit COMM for controlling the function and operation of PI-controller 100.

Figure 3:
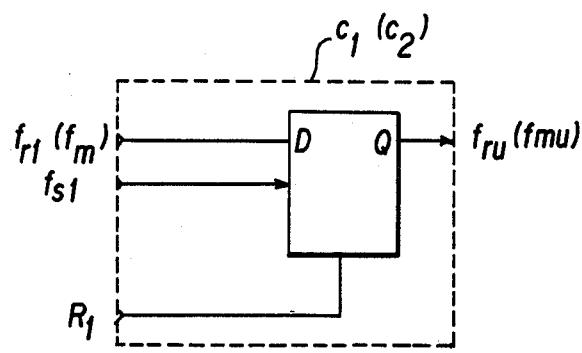
FIG. 3 is a circuit diagram of an asynchronous/synchronous converter.

Reference signal $f_{rl}$ processed by frequency divider unit FRD is fed to an asynchronous/synchronous converter $C_1$ which synchronizes reference signal $f_{rl}$ with a clock signal $f_{sl}$ generated by clock generator D and transmits synchronized reference signal $f_{ru}$ to a proportional circuit P and an integrator I. Referring to FIG. 3, the asynchronous/synchronous converter $C_1$ is formed by a flip-flop which is controlled by clock signal $f_{s1}$. An asynchronous/synchronous converter $C_2$ of identical construction to converter $C_1$ synchronizes speed signal $f_m$ with clock signal $f_{s1}$ and delivers synchronized speed signal $f_{mu}$ to proportional circuit P and integrator I.

Proportional circuit P generates a proportional signal $d_p$ in the form of an eight-bit two-complement signal which is dependent upon the difference in the cycle lengths of signals $f_{ru}$ and $f_{mu}$. Integrator I generates an integral signal $d_I$ in the form of an eight-bit signal which is dependent upon the difference in frequency between signals $f_{ru}$ and $f_{mu}$. Integral signal $d_I$ is multiplied by the factor $2^0$, $2^1$ or $2^2$ in a multiplier (shifter) $S_1$ depending upon the state of two binary control signals c and d. The multiplication results in the bits of integral signal $d_I$ being moved to the left by 0, 1 or 2 digits. The integral signal multiplied in this way is added to the proportional signal $d_p$ in an adder $A_1$. The 9-bit line of proportional circuit P can be so switched to adder $A_1$ that the proportional signal is shifted by one or two binary places, corresponding to a multiplication of this signal by a factor $2^1$ or $2^2$. The sum signal $d_{A1}$ generated by adder $A_1$ is fed to output stage ET in response to a read command $e_2$ generated by proportional circuit P.

Output stage ET comprises a latch $L_1$ which receives and stores (latches) the sum signal $d_{A1}$ of adder $A_1$ and in due course transmits it to a pulse width modulator PWM. An amplitude register A contains a preset amplitude signal $d_A$ in the form of an 8-bit signal which is fed to pulse width modulator PWM via a shifter $S_2$. Shifter $S_2$ corresponds to shifter $S_1$ in construction and function.

Pulse width modulator PWM generates direction signal $U_D$ and output signal $U_p$. The pulse width of output signal $U_p$ is proportional to signal $d_L$ taken from the latch $L_1$ and the cycle time of output signal $U_p$ is proportional to the amplitude signal $d_{S2}$ prepared by shifter $S_2$. During the data transmission from latch $L_1$ to pulse width modulator PWM, a signal cprop prevents proportional circuit P from generating read command $e_2$.

The preferred construction and operation of proportional circuit P will now be explained with reference to FIGS. 4 and 5. Preferably, proportional circuit P uses an up/down counter 200 and a logic circuit 202 which delivers the up and down counting commands for counter 200 depending upon synchronized speed signal $f_{mu}$ and reference signal $f_{ru}$. In addition to the synchronized speed and reference signals, the input signals received by logic circuit 202 include cprop, a reset signal $R_3$, clock signal $f_{s1}$ and another clock signal $f_{s2}$. The two clock signals $f_{s1}$ and $f_{s2}$ have the same frequency but are phase-shifted by a half-cycle as will be apparent from FIG. 5. The two clock signals may, for example, be produced from a rectangular signal of twice the frequency and with a clock ratio of 0.5.

Figure 4:
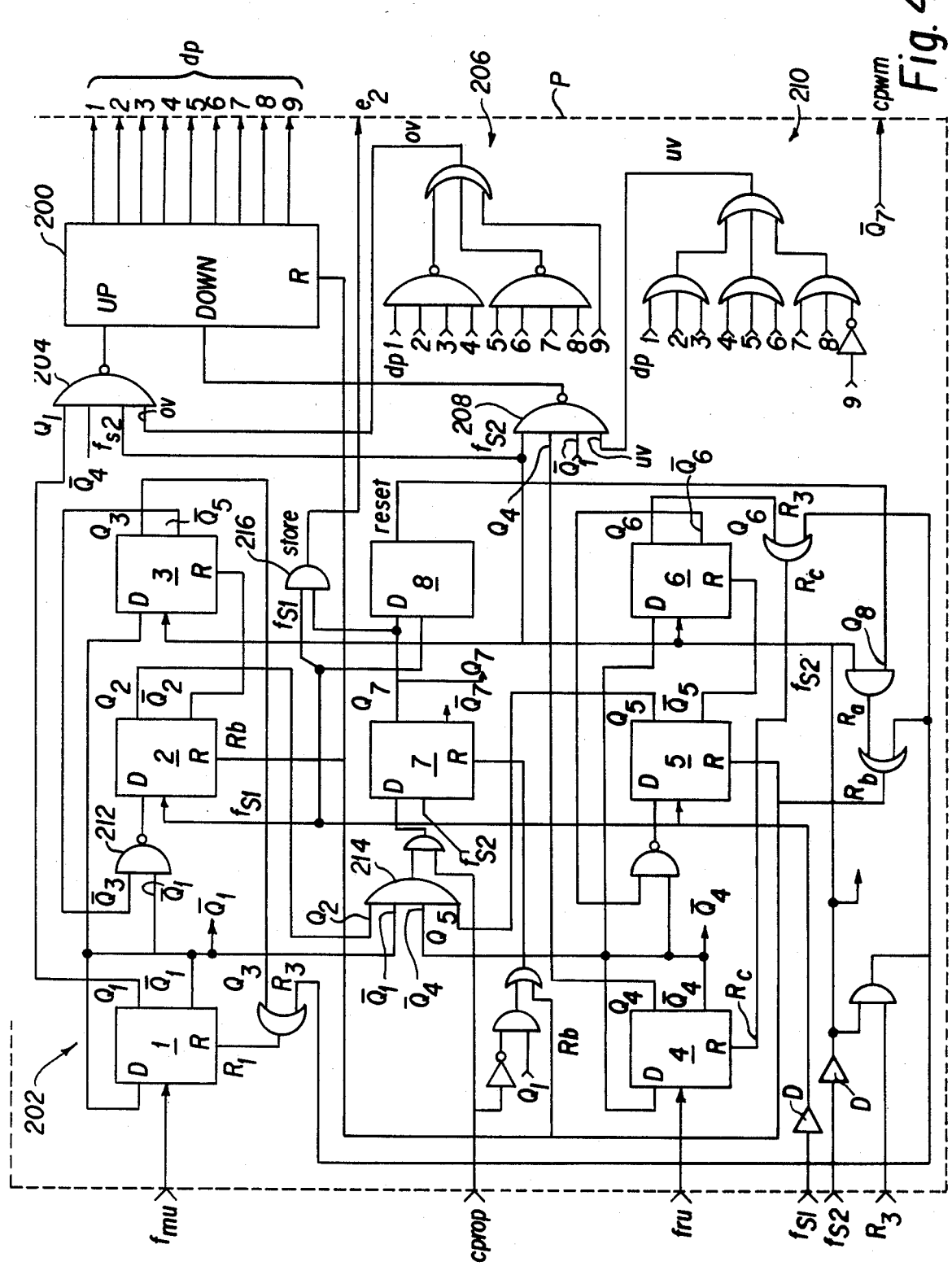
FIG. 4 is a circuit diagram of a proportional circuit for the controller shown in FIG. 2.
Figure 5:
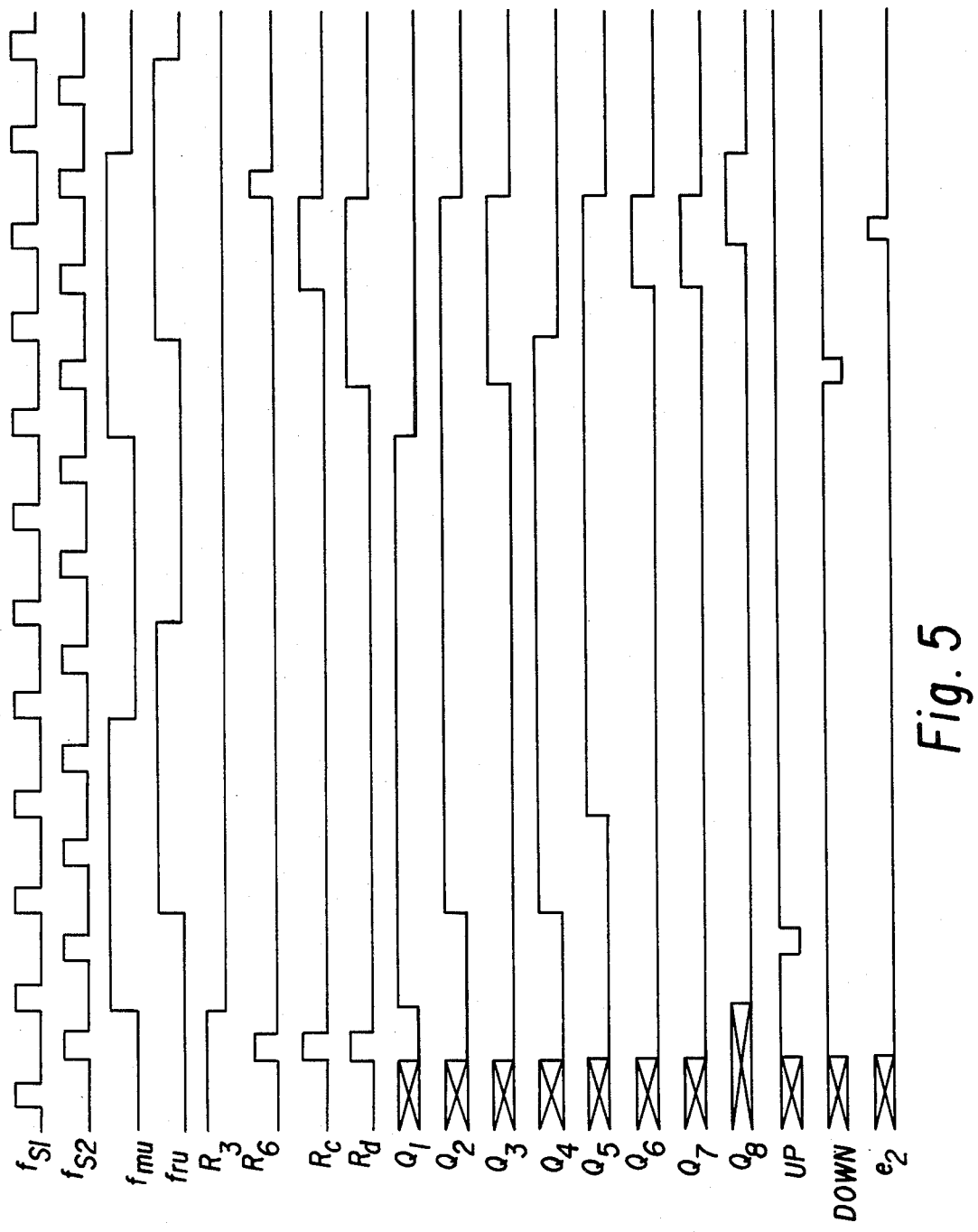
FIG. 5 is a time diagram of signals of the proportional circuit.

As shown in FIG. 4, synchronized speed signal $f_{mu}$ is fed as a clock signal to flipflop 1, whose input is connected to the inverting output $\overline{Q_1}$. Thus, output $Q_1$ of flipflop 1 changes its state on each rising flank of speed signal $f_{mu}$. The pulse width of output signal $Q_1$ is independent of the pulse width of speed signal $f_{mu}$ and coincides with the cycle length of speed signal $f_{mu}$. Output signal $Q_1$ should therefore be designated as a standardized speed signal. Flipflop 4 functions in the same manner as flipflop 1. Flipflop 4 receives synchronized reference signal $f_{ru}$ as a clock signal and generates a standardized reference signal $Q_4$.

The upward counting input UP of counter 200 is connected to the output of a NAND gate 204 which receives as an input signal: standardized speed signal $Q_1$; inverted standardized reference signal $\overline{Q_4}$, clock signal $f_{s2}$ and a signal ov. Signal ov normally has the value 1 and is set to 0 by a logic circuit 206 only when counter 200 has reached its top capacity limit (i.e. $> +255$). NAND gate 204 thus generates an upward counting pulse (logic 0) in synchronism with clock signal $f_{s2}$ when standardized speed signal $Q_1$ has the value 1 and standardized reference signal $\overline{Q_4}$ has the value 1.

The downward counting input DOWN of counter 200 is connected to the output of a NAND gate 208 which receives signals $f_{s2}$, $Q_4$ $\overline{Q_1}$ and uv as input signals. Input signal uv is generated by a logic circuit 210 and is used to protect counter 200 against falling below the bottom capacity limit (i.e. $< -256$). NAND gate 208 generates a downward counting pulse in synchronism with clock signal $f_{s2}$ when standardized reference signal $Q_4$ has the value 1 and standardized speed signal $Q_1$ has the value 0. The details of logic circuit 202 described hereinafter serve to terminate the counting operation after a complete cycle of both speed signal $f_{mu}$ and reference signal $f_{ru}$ have occurred.

A flipflop 3 receives signal $\overline{Q_1}$ as its input signal and delivers output signal $Q_3$ which resets flipflop 1. Flipflop 3, however, is controlled by clock signal $f_{s2}$, while speed signal $f_{mu}$ is synchronized with clock signal $f_{s1}$. Reset signal $Q_3$ therefore does not occur until some delay after the completion of one cycle of speed signal $f_{mu}$, that is after the decay of standardized signal $Q_1$. See FIG. 5. A flipflop 2 controlled by clock signal $f_{s1}$ receives input signal $Q_1 + Q_3$ (where "+" represents a logic OR) via a NAND gate 212. Flipflop 3 is reset by the inverted output signal $\overline{Q_2}$ of flipflop 2. Output signal $Q_2$ of flipflop 2 assumes the value 1 as soon as signal $Q_1$ assumes the value 1. When signal $Q_1$ *falls again*, $Q_2$ retains the value 1 since then $Q_3 = 1$. Flipflop 2 remains in the set state until it is reset by a signal $R_b$. Signal $Q_2$ thus indicates that signal $Q_1$ has occurred once.

Flipflops 5 and 6 are in the same relationship to flipflop 4 as flipflops 2 and 3 are to flipflop 1 and function in the same way as described above. Output signal $Q_5$ of flipflop 5 indicates that standardized reference signal $Q_4$ had the value 1 once.

When both speed signal $f_{mu}$ and reference signal $f_{ru}$ have passed through a complete cycle, signals $Q_1$ and $Q_4$ have the value 0 while signals $Q_2$ and $Q_5$ have the value 1. Under this condition the output of an AND gate 214 has the value 1. If signal cprop also has the value 1, a flipflop 7 controlled by clock signal $f_{s2}$ is set. An AND gate 216 receives output signal $Q_7$ of flipflop 7 and when the next clock signal $f_{s1}$ arrives, generates read command $e_2$ by means of which the contents $d_{p1}-d_{p9}$ of counter 200 are taken over by latch $L_1$ after addition with the signal $d_{s1}$ of shifter $S_1$ as shown in FIG. 2. At the same time, a flipflop 8 controlled by clock signal $f_{s1}$ is set by output signal $Q_7$. On coincidence of output signal $Q_8$ of flipflop 8 with clock signal $f_{s2}$ a signal $R_a$ is generated which is combined with signal $R_3$ by a logic OR and is fed as a signal $R_b$ to the reset inputs of counter 200 and flipflops 2 and 5. The next counting operation can thus begin as soon as either a pulse of speed signal $f_{mu}$ or a pulse of reference signal $f_{ru}$ arrives and the corresponding standardized signal $Q_1$ or $Q_4$ resumes the value 1.

Figure 7:
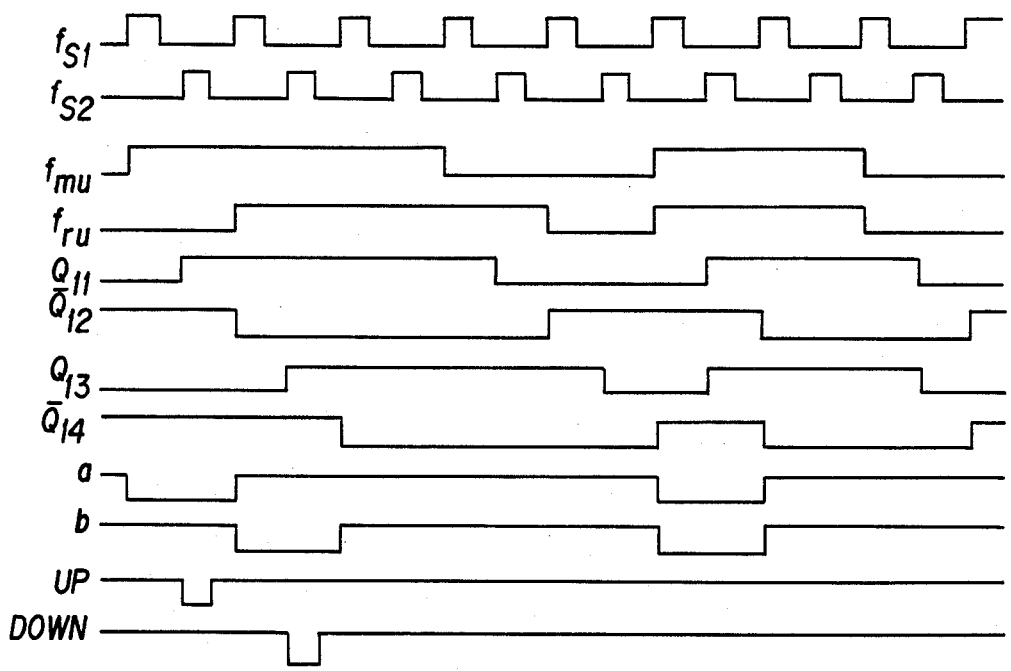
FIG. 7 is a time diagram of signals of the integrator circuit.
Figure 6:
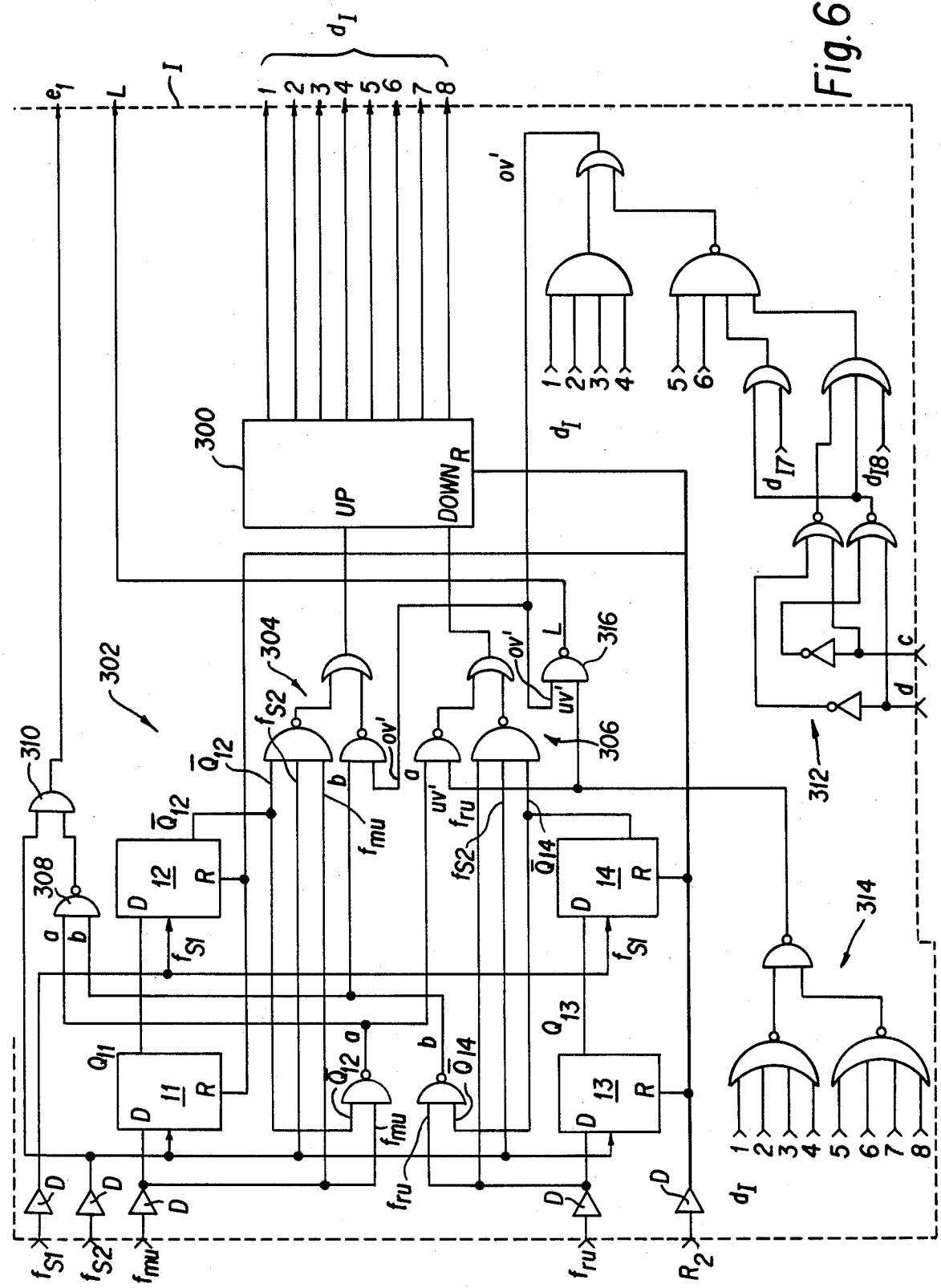
FIG. 6 is a circuit diagram of an integrator circuit for the controller shown in FIG. 2.

The preferred construction and operation of integrator I will now be explained with reference to FIGS. 6 and 7. Preferably, integrator I uses an up/down counter 300 with 8 bits and a logic circuit 302 for generating the up and down counting pulses. The input signals received by logic circuit 302 are clock signals $f_{s1}$ and $f_{s2}$, synchronized speed signal $f_{mu}$, synchronized reference signal $f_{ru}$, a reset signal $R_2$ and signals c and d which control the multiplication factor of shifters $S_1$ and $S_2$.

Clock signal $f_{s2}$ controls flipflops 11 and 13 which respectively receive speed signal $f_{mu}$ and reference signal $f_{ru}$. Clock signal $f_{s1}$ controls flipflops 12 and 14 which respectively receive output signal $Q_{11}$ of flipflop 11 and output signal $Q_{13}$ of flipflop 13. Upward counting input UP of counter 300 is connected to a circuit of logic gates 304 which have a NAND function. The input signals of circuit 304 are: inverted output signal $\overline{Q_{12}}$ of flipflop 12; clock signal $f_{s2}$; speed signal $f_{mu}$; a signal b; and a signal ov'. The significance of signals b and ov' will be discussed later. At this stage it will be assumed that these signals have the value 1. When the state of signal $f_{mu}$ changes from 0 to 1, an upward counting pulse of logic 0 is generated on the next clock pulse $f_{s2}$. Before the arrival of the next clock pulse $f_{s2}$, signal $\overline{Q_{12}}$ drops so that the other counting pulses are suppressed until the associated cycle of signal $f_{mu}$ is over. Thus only exactly one counting pulse is generated for each speed signal cycle.

Similarly, a circuit of logic gates 306 which have a NAND function generate exactly one downward counting pulse for each cycle of reference signal $f_{ru}$ if input signals a and uv' have the value 1. Logic circuit 306 functions in a similar manner to logic circuit 304.

The signals $a = \overline{f_{mu} \cdot Q_{12}}$ and $b = \overline{f_{ru} \cdot Q_{14}}$ (where represents a logic AND) prevent counter 300 from simultaneously receiving an upward and a downward counting pulse. Signal a assumes the value 0 when the conditions for an upward counting pulse are present, and in that case blocks the generation of a downward counting pulse. Signal b assumes the value 0 when the conditions are present for a downward counting pulse and in that case blocks the generation of the upward counting pulse. In addition, signals a and b control the transmission of read command $e_1$ to output stage ET. Read command $e_1$ is generated by an AND gate 310 which receives clock signal $f_{s1}$ and signals a and b after they have been processed through a NAND gate 308.

Signals ov' and uv' are generated by logic circuits 312 and 314, respectively, and are intended to protect counter 300 from exceeding the top capacity limit or bottom capacity limit, respectively. Signal ov' generated by logic circuit 312 is dependent not only upon output signals $d_{j1}$–$d_{j8}$ of counter 300, but also upon signals c and d. When the multiplication factor in shifter $S_1$ is set to $2^1$ or $2^2$ by signals c and d, the capacity of counter 300 is artificially reduced by one or two binary digits respectively to prevent the capacity from being exceeded in shifter $S_1$. If the capacity of counter 300 is exceeded or undershot, a NAND gate 316 delivers a signal L which is transmitted as a fault signal to the superior control system.

Figure 8:
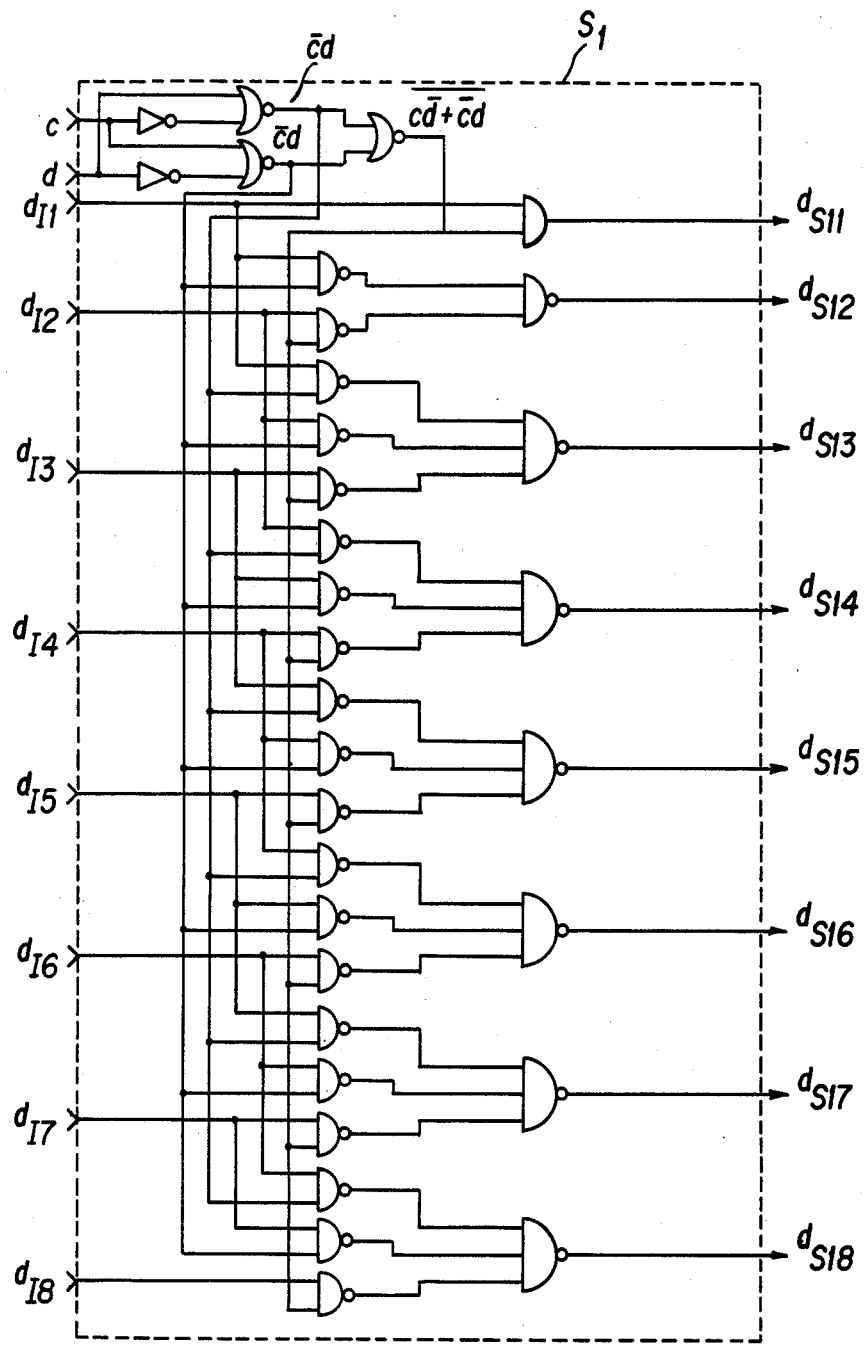
FIG. 8 is a circuit diagram of a multiplier network.

Shifter $S_1$ is built substantially of NAND gates. The circuit details and configuration are typical and will be clear from FIG. 8.

If controls signals c and d both have the value 0 or 1, the 8-bit signal $d_I$ indicating the contents of the counter 300 remains unchanged (i.e. $d_{S1} = d_I$). If, however, signal c has the value 0 and signal d has the value 1, integral signal $d_I$ is multiplied by the factor $2_1$ (i.e. $d_{S11} = 0$, $d_{S12} = d_{I1}$, $d_{S13} = d_{I2}$, etc). If signal c has the value 1 and signal d has the value 0, integral signal $d_I$ is multiplied by the factor $2^2$ (i.e. $d_{S11} = 0$, $d_{S12} = 0$, $d_{S13} = d_{I1}$, $d_{S14} = d_{I2}$, etc).

Shifter $S_2$ also receives control signals c and d and causes amplitude signal $d_A$ to vary in accordance with the variation of integral signal $d_I$. Control signals c and d, therefore, provide a simple means for adjusting the weighting of the proportional component and the integral component in the controller according to the present invention in order to adapt the control characteristic to the specific control system.

The present controller also affords the possibility of setting different speeds for the controlled motor. The division ratio of the frequency divider unit FRD can be varied, thereby reducing the frequency of reference signal $f_r$. As can be seen in FIG. 2, frequency divider unit FRD comprises a frequency divider $D_1$, which can be operated with selectable division ratios between 1:1 and 1:255. Two different division ratios for frequency divider $D_1$ can be stored in two shift registers $D_{f1}$ and $D_{f2}$. Switching between the two shift registers $D_{f1}$ and $D_{f2}$ is possible by means of a binary control signal $a_1$ so that frequency divider $D_1$ operates either with the division ratio stored in shift register $D_{f1}$ or with the division ratio stored in shift register $D_{f2}$.

Clock generator D comprises an oscillator OSC which delivers a signal $f_{c1}$ at a frequency of 10 MHz to a frequency divider $D_2$. Frequency divider $D_2$ delivers a number of parallel frequency signals which are produced by frequency division with different division ratios in the range from 1:4 to 1:56 from the frequency of signal $f_{c1}$. A multiplexer $M_1$ receives seven different frequency signals from frequency divider $D_2$ and selects one of these frequency signals depending upon a 3-bit signal $DFm_1$.

The selected frequency signal $f_{pwm}$ is fed as a clock signal to output stage ET. Another multiplexer $M_2$ receives fifteen different signals from frequency divider $D_2$ and selects one of these fifteen frequency signals depending upon a 4-bit signal $DFm_2$. The selected frequency signal is fed to a frequency divider $D_3$. Frequency divider $D_3$ comprises a flipflop which halves the frequency of the selected frequency signal delivered by multiplexer $M_2$. Phase-shifted clock signals $f_{s1}$ and $f_{s2}$ are generated by a NOR combination of the output signal of multiplexer $M_2$ and the inverting and noninverting output of the flipflop in frequency divider $D_3$.

Signals $DFm_1$ and $DFm_2$, which determine what frequencies are selected as the outputs of multiplexers $M_1$ and $M_2$, are delivered either by a shift register $Df_3$ or a shift register $Df_4$. The selection of shift register $Df_3$ or $Df_4$ is controlled by a signal $a_1$ which also controls the selection of shift registers $Df_1$ and $Df_2$ of frequency divider unit FRD.

In this way, when PI-controller 100 is switched to a different speed, clock signals $f_{pwm}$, $f_{s1}$ and $f_{s2}$ are also automatically adapted to the new conditions so that controller adjustment is maintained. In particular, the change of clock frequencies $f_{s1}$ and $f_{s2}$ also adjusts the proportionality factor in proportional circuit P since clock frequency $f_{s2}$ forms the counting frequency of counter 200 in proportional circuit P.

Figure 9:
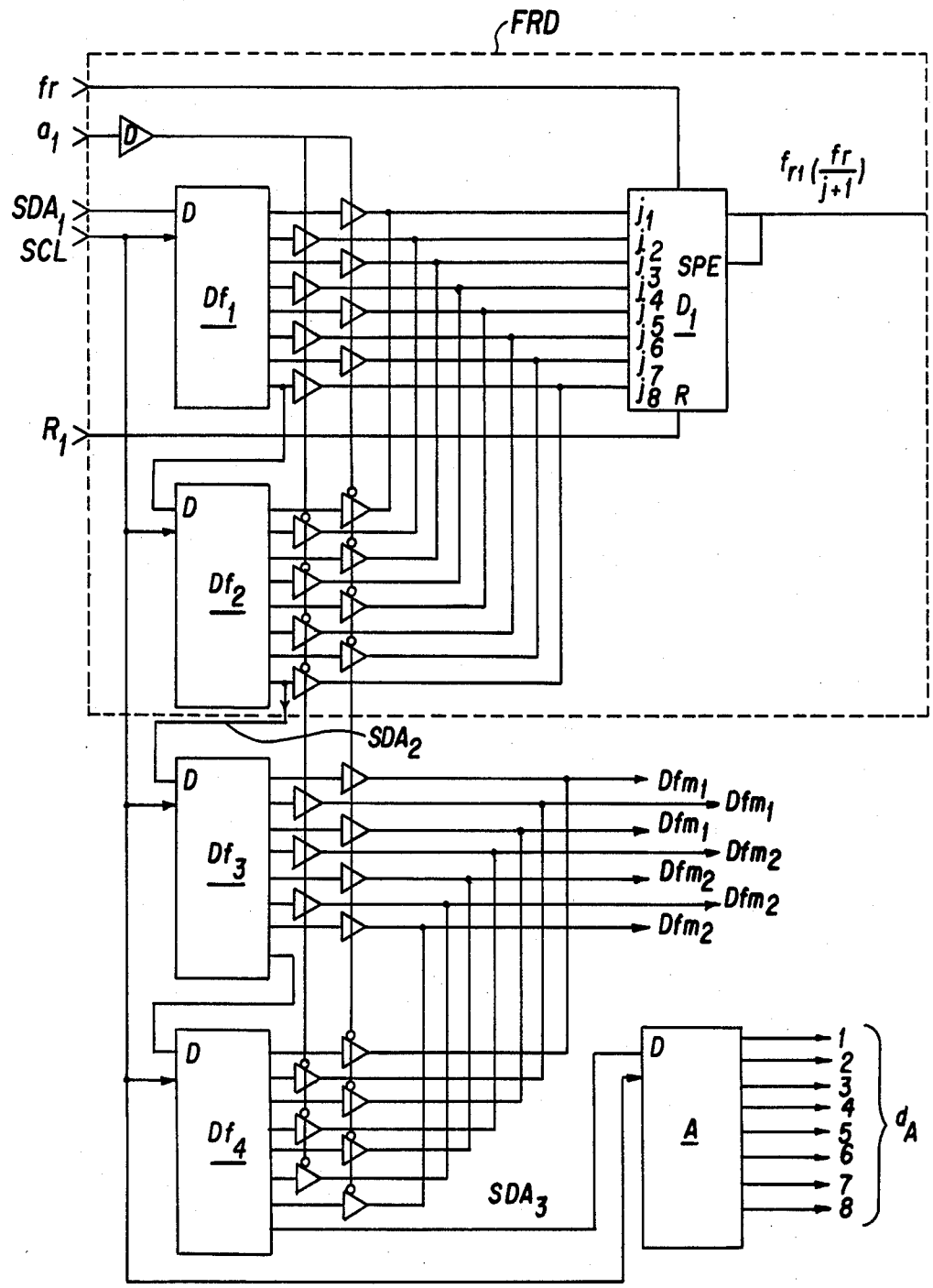
FIG. 9 is a circuit diagram of a frequency divider and a chain of shift registers for controlling the frequency divider and other components of the controller.

As can be seen in FIG. 9, shift registers $Df_1$, $Df_2$, $Df_3$, $Df_4$ and amplitude register A are connected in series and to a common clock signal SCL. On initialization of the controller, the data to be stored in these registers is fed in the form of a serial data signal SDA and is transmitted through shift registers $Df_1$–$Df_4$ and A. Upon operation of controller 100, the contents of shift registers $Df_1$ or $Df_2$ are transmitted to frequency divider $D_1$ and signals $DFm_1$ and $DFm_2$ which control multiplexers $M_1$ and $M_2$ are transmitted from shift register $Df_3$ or $Df_4$. The transmission of signals from $Df_1$ or $Df_2$ and $Df_3$ or $Df_4$ is effected via electronic switches which are controlled alternately by signal $a_1$.

An advantageous modification of the preferred embodiment described herein is possible by forming shift registers $Df_1$–$Df_4$ and amplitude register A as parallel registers to which the data is fed for storage in parallel via a bus.

Command signal $a_1$, serial data signal SDA and clock signal SCL are generated by command unit COMM. Command unit COMM also generates control signals c and d for shifters $S_1$ and $S_2$ and reset signals $R_1$–$R_5$ for resetting the individual controller components, and a signal h which controls the direction of rotation of the motor.

Command unit COMM communicates with a superior control system via an I²C-bus. This bus is a two-wire data transmission system over which a data signal and a clock signal, or a control signal are transmitted. During transmission of data, the data and clock signal are so modulated that the signals in the two wires of the bus always have opposite polarity. However, during transmission of control signals which, for example, indicate the start or the end of a data transmission, the signal is so modulated that the two wires of the bus have the same polarity. In this way it is possible to distinguish between data signals and control or command signals.

Command unit COMM comprises an I²C interface which during data transmission recovers the clock signal and the data signal from the modulated signals of the two bus channels. On initialization of the controller, the clock signal is transmitted to shift registers $Df_1$–$Df_4$ and A and the next five data bytes are read serially into these shift registers. Further commands such as commands for switching the controller on and off, changing the speed (change of state of signal $a_1$) and for changing the multiplication factor of shifters $S_1$, $S_2$ (change of state of signals c and d) can then be transmitted via the I²C bus. The commands or data transmitted to the command unit COMM can also be acknowledged via the I²C bus. Similarly, status signal L which indicates the status of counter 300 of integrator I can be sent back to the superior control unit.

Command unit COMM also comprises I/O ports h, i, j and k. Controller 100, therefore, can alternatively be controlled via parallel lines connected to I/O ports h, i and j. I/O ports h, i, j and k also serve for carrying out test operations. If the signal 1 is applied to port i, command unit COMM delivers clock signals $f_{s1}$, $f_{s2}$ and $f_{pwm}$ to ports h, k and j, respectively. If the signal 0 is applied to the port i, synchronized speed signal $f_{mu}$ and reference signal $f_{ru}$ are sent back via ports h and k, respectively.

The controller can also be adjusted to operate only as a P-controller or only as an I-controller.

The invention is not limited to the above-described presently preferred embodiment. With the teachings disclosed herein, one skilled in the art will be able to carry out numerous modifications of the present invention which has been shown and described with particularity. Such modifications are also embodied within the scope and protection of the following claims.

What is claimed is:

1. An electronic proportional-integral controller for controlling the speed of an electric motor in accordance with a reference signal whose frequency represents the desired output speed of the controlled electric motor and a speed signal whose frequency represents the actual output speed of the controlled electric motor, comprising:
   (a) a proportional circuit for generating a P-control signal corresponding to the difference between the frequencies of the reference signal and the speed signal and wherein the proportional circuit comprises a logic circuit connected to an up/down counter such that the logic circuit:
   (1) converts the speed signal into a standardized speed signal which changes its state on each rising flank of the speed signal;
   (2) converts the reference signal into a standardized reference signal which changes its state on each rising flank of the reference signal;
   (3) delivers a sequence of upward counting pulses to the counter in synchronism with a first clock signal when there is present a pulse of the standardized speed signal and no pulse of the standardized reference signal;
   (4) delivers a sequence of downward counting pulses to the counter in synchronism with the first clock signal when there is present a pulse of the standardized reference signal and no pulse of the standardized speed signal;
   (5) generates a read signal to output the value of the counter which is the P-control signal; and
   (6) generates a reset signal to reset the counter if a pulse has occurred in both the standardized speed signal and in the standardized reference signal and both standardized signals simultaneously have a pulse break;
   (b) an integrator circuit which uses the speed signal and the reference signal for generating an I-control signal corresponding to the time integral of the difference between the frequencies of the reference signal and the speed signal;
   (c) an addition circuit connected to both the proportional circuit and the integrator circuit for generating a sum signal corresponding to the sum or the weighted sum of the P-control and I-control signals; and
   (d) an output stage for controlling the motor in accordance with the sum signal of the addition circuit.

2. A controller as described in claim 1 wherein the integrator circuit comprises a logic circuit connected to an up/down counter such that the logic circuit delivers to the counter an upward counting pulse on each rising flank of the speed signal and a downward counting pulse on each rising flank of the reference signal and wherein the value of the counter after one cycle of the speed signal and the reference signal represents the time integral of the difference between the frequencies of the speed signal and the reference signal.

3. A controller as described in claim 2 wherein a first asynchronous/synchronous converter synchronizes the rising and falling flanks of the speed signal with the pulses of a second clock signal before the speed signal is fed to the proportional circuit and the integrator circuit, and a second asynchronous/synchronous converter synchronizes the rising and falling flanks of the reference signal with the pulses of the second clock signal before the reference signal is fed to the proportional circuit and the integrator circuit.

4. A controller as described in claim 3 wherein the second clock signal has the same frequency as the first clock signal and is phase-shifted therefrom by a half cycle.

5. A controller as described in claim 2 wherein a frequency divider unit reduces the frequency of the reference signal in accordance with a selectable dividing ratio before supplying it to the proportional circuit and the integrator.

6. A controller as described in claim 5 wherein a frequency multiplier unit increases the frequency of the reference signal before it is fed to the frequency divider unit.

7. A controller as described in claim 6 wherein a first asynchronous/synchronous converter is connected to the frequency divider unit and synchronizes the rising and falling flanks of the reference signal with the pulses of a second clock signal before the reference signal is fed to the proportional circuit and the integrator circuit, and a second asynchronous/synchronous converter synchronizes the rising and falling flanks of the speed signal with the pulses of the second clock signal before the speed signal is fed to the proportional circuit and the integrator circuit.

8. A controller as described in claim 5 wherein the frequency divider unit comprises a frequency divider and two memories for storing two different frequency division ratios such that a binary control signal determines which division ratio the frequency divider uses.

9. A controller as described in claim 8 further comprising a clock generator for generating all clock signals such that the frequency of the clock signals and the division ratio of the frequency divider are determined by the same binary control signal.

10. A controller as described in claim 2 wherein an amplitude value is combined with the sum signal in the output stage to generate the magnitude of the output signal.

11. A controller as described in claim 10 wherein the output signal generated by the output stage has a pulse width corresponding to the sum signal and a cycle length corresponding to the amplitude value.

12. A controller as described in claim 11 wherein the I-control signal and the amplitude value are each multiplied in a shifter by the same power of two.

13. A controller as described in claim 2 further comprising a command unit which transmits data and control signals to individual components of the controller, and which has an interface for a two-wire bus system.

14. A copying machine comprising a plurality of subsystems with separate drives which are synchronized with one another by an electronic controller as described in claim 1.

15. An electronic proportional controller for controlling the speed of an electric motor in accordance with a reference signal whose frequency represents the desired output speed of the controlled electric motor and a speed signal whose frequency represents the actual output speed of the controlled electric motor, comprising:
(a) a proportional circuit for generating a P-control signal corresponding to the difference between the frequencies of the reference signal and the speed signal and wherein the proportional circuit comprises a logic circuit connected to an up/down counter such that the logic circuit:
   (1) converts the speed signal into a standardized speed signal which changes its state on each rising flank of the speed signal;
   (2) converts the reference signal into a standardized reference signal which changes its state on each rising flank of the reference signal;
   (3) delivers a sequence of upward counting pulses to the counter in synchronism with a first clock signal when there is present a pulse of the standardized speed signal and no pulse of the standardized reference signal;
   (4) delivers a sequence of downward counting pulses to the counter in synchronism with the first clock signal when there is present a pulse of the standardized reference signal and no pulse of the standardized speed signal;
   (5) generates a read signal to output the value of the counter which is the P-control signal; and
   (6) generates a reset signal to reset the counter if a pulse has occurred in both the standardized speed signal and in the standardized reference signal and both standardized signals simultaneously have a pulse break;
(b) an addition circuit connected to the proportional circuit for generating a sum signal corresponding to a predetermined weighting of the P-control signal; and
(c) an output stage for controlling the motor in accordance with the sum signal of the addition circuit.

16. an electronic integral controller for controlling the speed of an electric motor in accordance with a reference signal whose frequency represents the desired output speed of the controlled electric motor and a speed signal whose frequency represents the actual output speed of the controlled electric motor, comprising:
(a) an integrator circuit for generating an I-control signal corresponding to the time integral of the difference between the frequencies of the reference signal and the speed signal and wherein the integrator circuit comprises a logic circuit connected to an up/down counter such that the logic circuit:
   (1) delivers an upward counting pulse to the counter on each rising flank of the speed signal;
   (2) delivers a downward counting pulse to the counter on each rising flank of the reference signal;
   (3) generates a read signal after one cycle of the speed signal and the reference signal to output the value of the counter which is the I-control signal;
(b) an addition circuit connected to the integrator circuit for generating a sum signal corresponding to a predetermined weighting of the I-control signal; and
(c) an output stage for controlling the motor in accordance with the sum signal of the addition circuit.

* * * * *